March 15, 1960
J. F. LILL
2,928,617
COIL WINDING APPARATUS
Filed Jan. 3, 1955
5 Sheets-Sheet 1
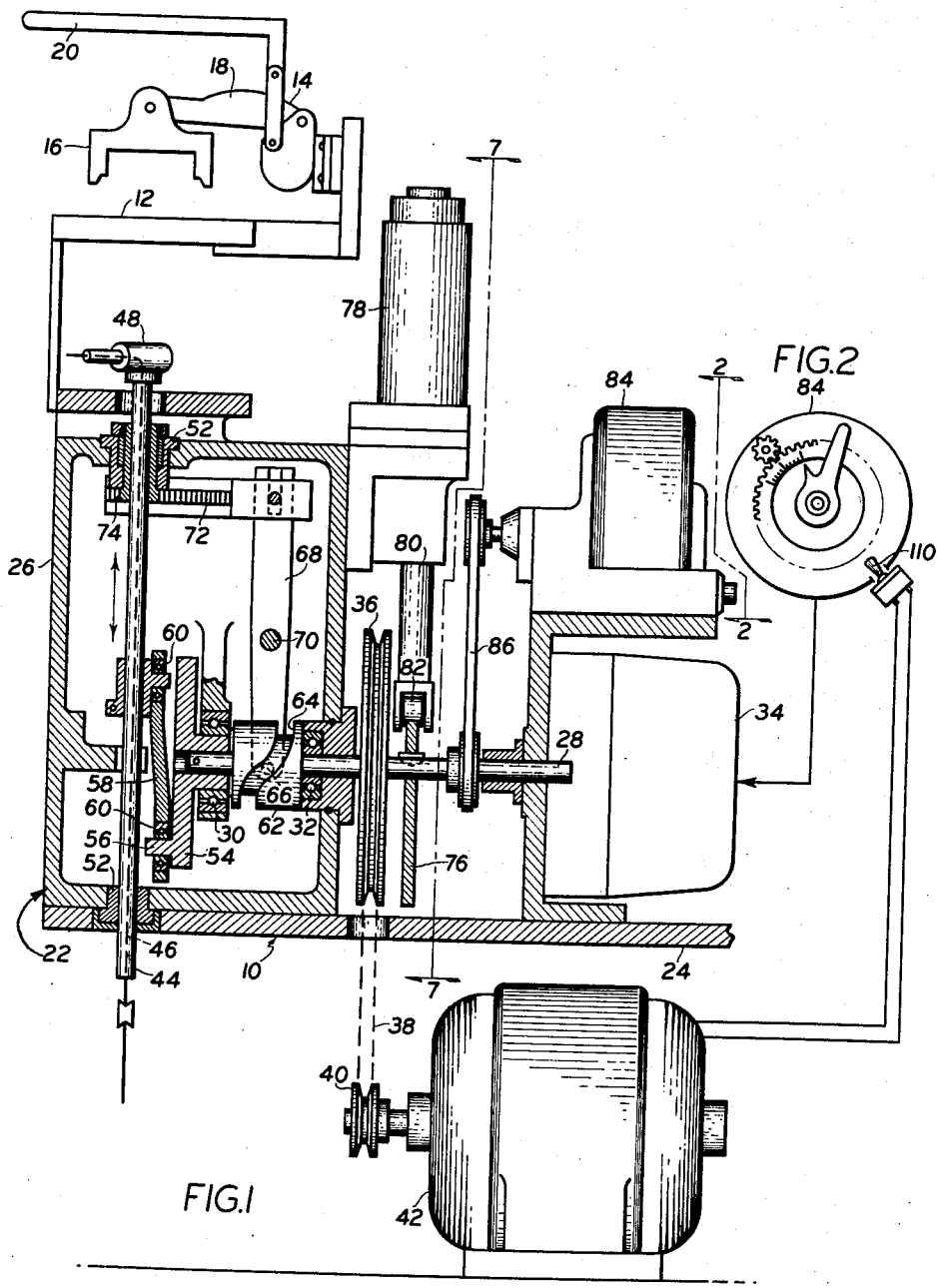
INVENTOR.
JOHN F. LILL
BY
Lockwood, Galt, Woodard, & Smith
ATTORNEYS March 15, 1960 J. F. LILL 2,928,617
COIL WINDING APPARATUS
Filed Jan. 3, 1955 5 Sheets-Sheet 2
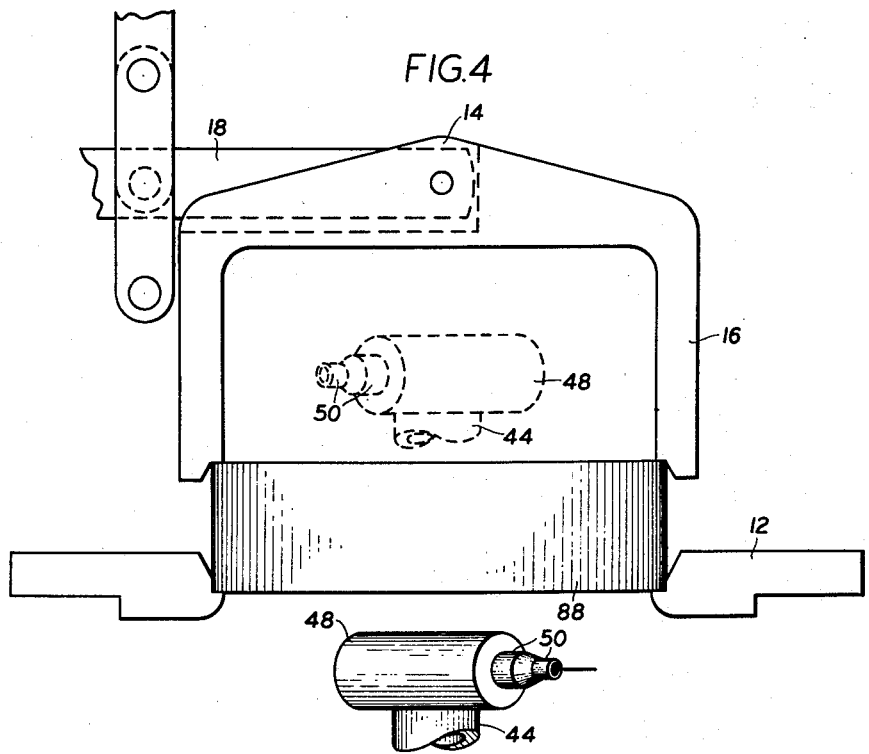
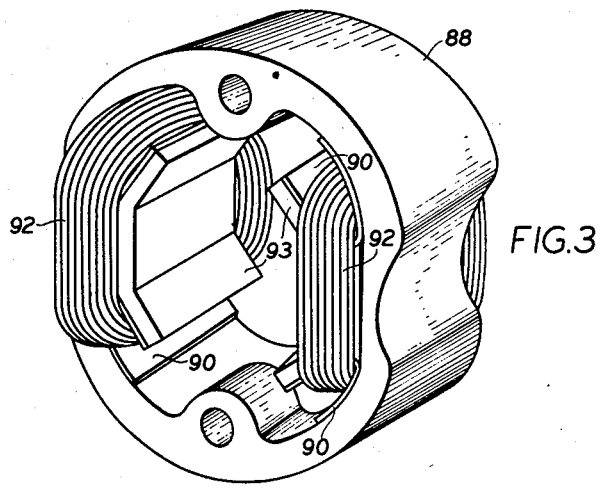
INVENTOR.
JOHN F. LILL
BY
Lockwood, Galt, Woodard, & Smith
ATTORNEYS March 15, 1960 J. F. LILL 2,928,617
COIL WINDING APPARATUS
Filed Jan. 3, 1955 5 Sheets-Sheet 3

INVENTOR.
JOHN F. LILL
BY
Lockwood, Galt, Woodard, & Smith
ATTORNEYS

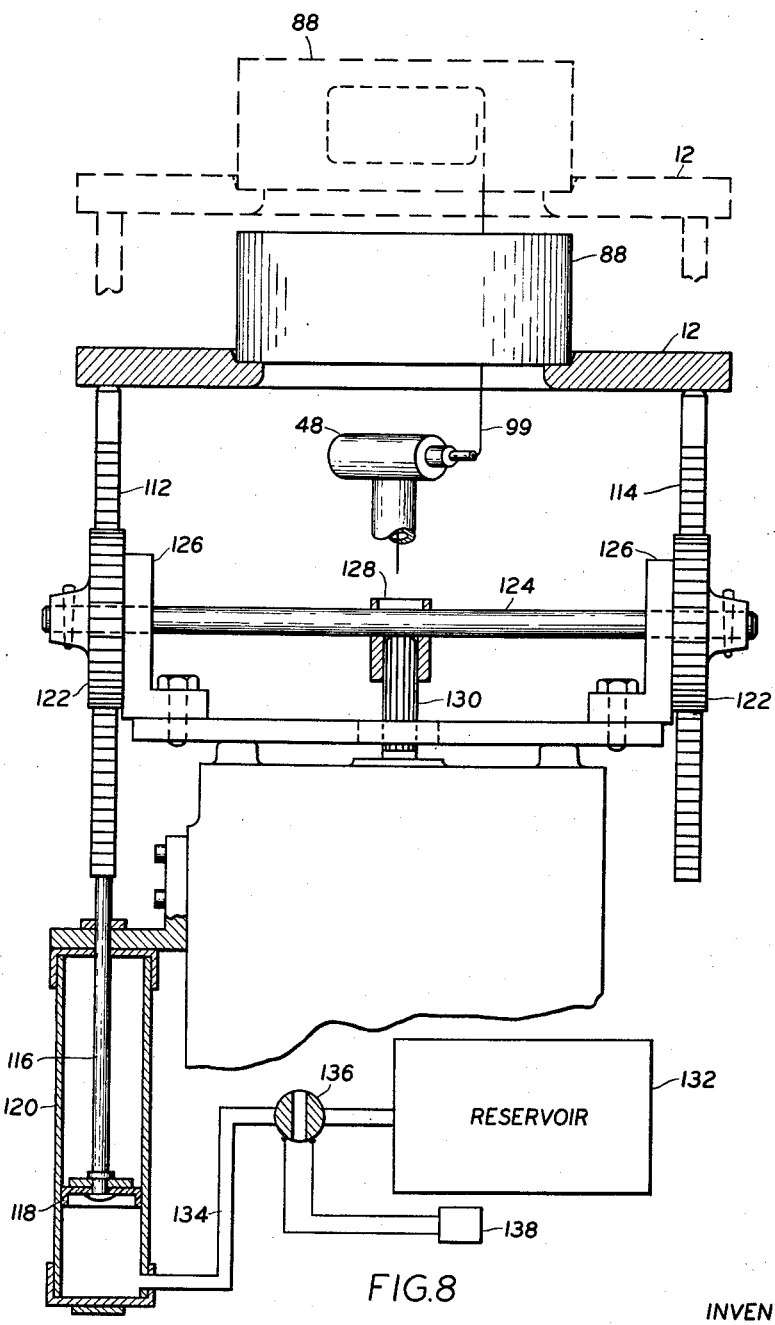

United States Patent Office 2,928,617
Patented Mar. 15, 1960

2,928,617

COIL WINDING APPARATUS

John F. Lill, Fort Wayne, Ind., assignor to Fort Wayne Tool Die & Engineering Company, Fort Wayne, Ind., a corporation of Indiana Application January 3, 1955, Serial No. 479,269

1 Claim. (Cl. 242—1.1)

This invention relates to a coil winding apparatus which wraps wire around cores of stators in making magnetic poles for electric motors.

The following description refers to stators for electric motors, but this is only for illustrative purposes. It will be apparent that numerous applications of the invention exist for other devices on which windings of wire form a necessary construction.

In an apparatus of the general class described, it is desirable to obtain as nearly complete automatic operation as possible for the process of winding coils. The underlying reasons for automation are manifold. For one thing, the winding operation tends to produce a more uniform article of manufacture; the productivity of the operator is increased; and the quality of the articles can be more closely controlled. These are typical of the many reasons for providing automatic operation.

In this invention it is my over all object to obtain by automatic process a uniform coil winding operation which is controllable to provide selected numbers of coil windings from which uniform lengths of "lead" wire extend.

An important feature of the invention is that the winding element is returned to the same initial starting position following each winding operation.

It is a further feature of the invention to facilitate removal of wound stators by stripping off a standard length of wire which trails from the wound stator, but which remains uncut so that the wound stator serves as an anchor for wire which is wound around a succeeding stator.

It is a further object of the invention to provide means for receiving a wound stator when the winding operation is completed for providing an anchor for wire used in winding a succeeding stator.

Other objects and features of the invention will become apparent from the following description which proceeds with reference to the accompanying drawings, wherein:

Fig. 1 is a side elevation of the coil winding apparatus, the portion of the apparatus which receives the wound stator being shown removed;

Fig. 2 shows a counter mechanism viewed in the direction indicated by the arrows 2—2 in Fig. 1;

Fig. 3 is an isometric view of a wound stator;

Fig. 4 is an enlarged detail view of the stator in the winding nest, with the winding head shown in the opposite extreme vertical and angular displacements thereof;

Fig. 8 is a detail view of the winding nest elevating means.

Figure 5:
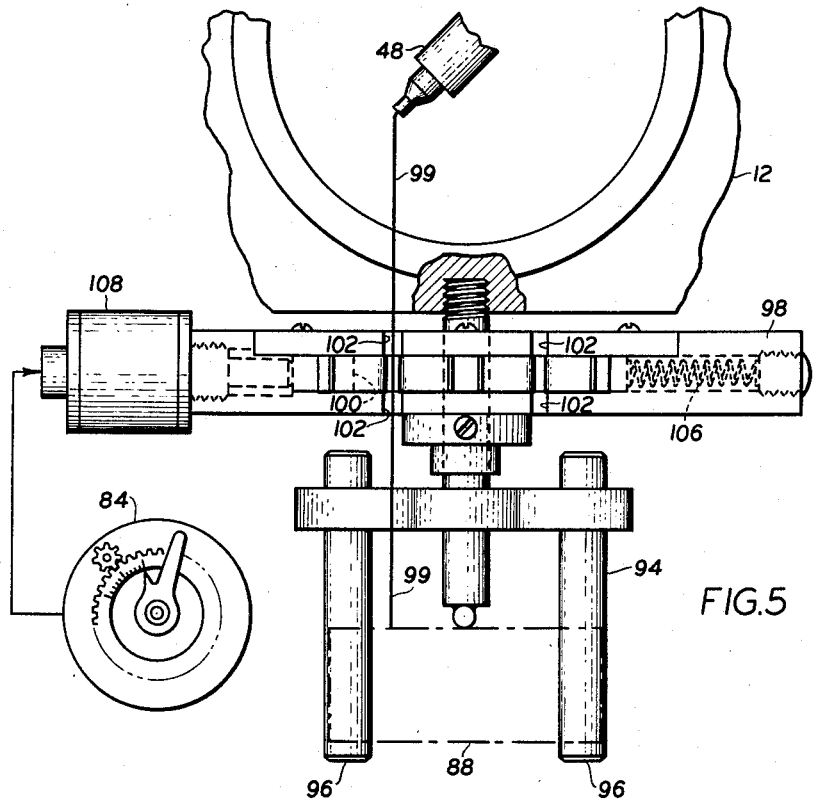
Figs. 5 and 6 are top and front views respectively of the stator-receiving portion of the apparatus and wire cutting device. A part of the winding nest is broken away in Fig. 5.

The coil winding apparatus indicated generally by the reference numeral 10 includes an elevatable winding nest 12 (Figs. 1, 4, 8) and a stator hold-down device 14.

The stator hold-down device 14 comprises a clamp 16 pivoted on an arm 18 which is operated by a handle 20.

The apparatus is housed in a cabinet 22 having a platform 24 and a box-shaped upright member 26 for supporting various components of the apparatus.

A horizontal shaft 28 is rotatably mounted on antifriction bearings 30 and 32. The shaft 28 extends into operative engagement with a magnetic brake 34. Pulley 36 is keyed to the shaft 28 and is driven by a belt 38 which is wound over a pulley 40 of motor 42.

A vertical shaft 44, having a longitudinally extending bore 46, is provided with a winding head 48 at the end thereof. The winding head consists of stepped diameter barrels 50 (Fig. 4) which are mounted transversely of the vertical shaft 44 (Figs. 1, 4). The shaft 44 is guided in bushings 52 for vertical reciprocation.

A crank 54 is pinned or otherwise secured at one end of shaft 28. The crank 54 has a nib 56 which extends into a connecting rod 58. Each end of the connecting rod is provided with bearings 60 which permit turning of the connecting rod at either end thereof. A barrel cam 62 is fixedly secured to the shaft 28. Spiral groove 64 is formed in the outer surface of the barrel cam 62, and a cam follower 66 extends into the groove 64. The cam follower 66 is attached to one end of a lever 68, which is pivoted at 70 and has a gear rack 72 fastened to the other end thereof. A pinion 74 is splined to the vertical shaft 44 and meshes with the rack 72.

Figure 7:
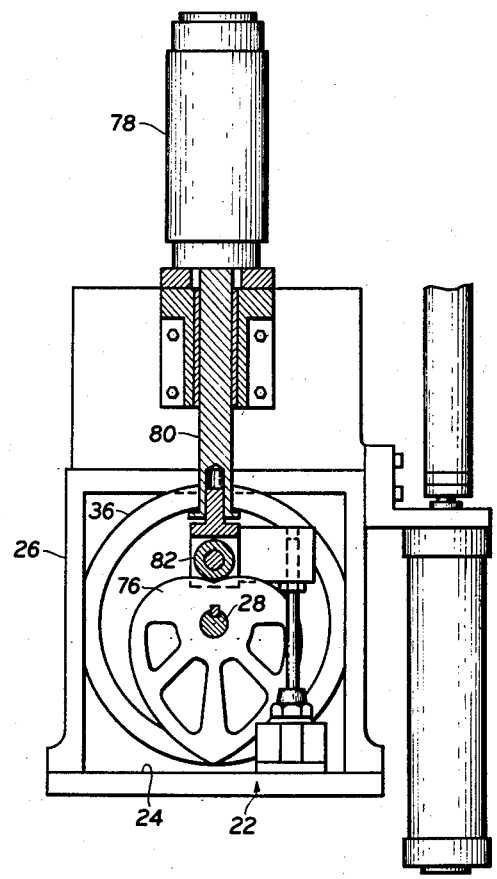
Fig. 7 is a detail view of the winding head return device, the view being taken generally on the line 7—7 of Fig. 1.

A mechanism is provided to return the winding head to a given position (the starting position for winding a coil). This mechanism is composed of a heart-shaped cam 76 (Fig. 7) which is keyed to the horizontal shaft 28 (Fig. 7). A power cylinder 78 is suspended over the heart-shaped cam 76, and a plunger 80 is actuated in a downward direction (Fig. 7) by the power cylinder, bringing roller 82 against the perimeter of the heart-shaped cam.

A counter 84 of any suitable construction is connected to the shaft 28 by means of a belt and pulley 86. The shaft 28 operates the counter 84 whereby the counter registers the number of revolutions of the shaft 28. A typical counter satisfactory for this apparatus is shown in Patent No. 2,489,474. The disclosure of this patent is intended to be incorporated herein and made a part of this description. A suitable commercially available counter is manufactured by the "Counter and Control Corporation" of Milwaukee, Wisconsin, and identified by Model No. "CMS-2S." A publication disclosing this counter is Bulletin 202-8 of the same corporation.

Fig. 3 shows a typically wound stator 88 which the present invention can construct. Notches 90 are formed in the inner portion of the stator, and coils of wire 92 are laid in these notches to form windings for the poles 93.

A support 94 (Figs. 5 and 6) serves to receive a wound stator 88. This support is offset from and secured to the winding nest 12 and consists of two projecting posts 96 which can be adjusted toward or away from the receiving nest in any suitable manner.

When the wound stator 88 is laid on the support 94 there is a trailing strand of wire which extends from the last turn of the wound coil of the stator. There will next be considered the means for cutting this strand of wire.

The cutting means comprises: (see Figs. 5 and 6) a bar 97 which is slidably mounted in a U-shaped cross-section member 98, the sides of the channel member 98 serving to guide the reciprocable movement of the bar 97 therein. Notches 100 and 102 are formed in the bar 97 and member 98, respectively. Flared guides 104 are fastened to member 98. The guides 104 facilitate placement of the trailing strand of wire 99 within the aligned cutting notches 100 and 102 when the stator is wound and laid across the posts 96.

Figure 6:
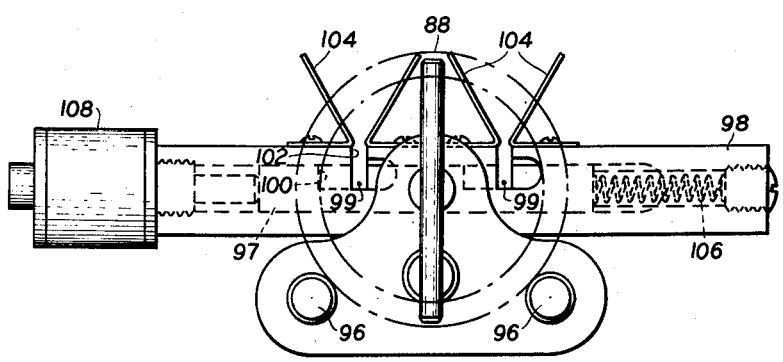

A spring 106 urges the bar 97 in the normally leftward position shown in Figs. 5 and 6. A power cylinder 108 is operatively connected to the bar 97 and is adapted to force the bar toward the right on a wire-cutting stroke.

Referring to Fig. 8, the winding nest 12 is supported on two vertically movable gear racks 112 and 114. The gear rack 112 is connected through a plunger 116 to a piston 118, which is slidably mounted in air cylinder 120. Gear wheels 122 are mounted on the opposite ends of a rotatable shaft 124 which is journalled in fixed support brackets 126 and a bushing 128 which is a splined upright post 130. A pressure source, such as a reservoir or the like 132, is connected with the air cylinder 120 through a conduit 134. A control valve 136 is operated by a control means 138 which is actuated by the operator of the apparatus. The control means may be in the form of a foot pedal or the like.

In operation, stator 88 (Fig. 4) is laid in the winding nest 12 and the clamp 16 is brought down against the stator to hold it in place.

The counter 84 is pre-set to control the number of turns which are to be wound on the stator 88, this number being measured by the revolutions of the horizontal shaft 28. It will be noted that the winding head 48 starts from the position shown in Fig. 1, which is the nadir of its stroke.

Wire is strung through the bore 46 in the vertical shaft 44 and out the winding head 48. The free end of the wire is then tied (anchored) to one of the posts 96.

The motor 42 is next started, driving the horizontal shaft 28. Turning of the shaft 28 causes the crank 54 to rotate, which in turn acts through the connecting rod 58 to produce a vertical bobbing or reciprocation of the winding head 48 through the vertical distance shown in Fig. 4. Turning of the shaft 28 also acts through the barrel cam 62 to rock the lever 68 back and forth on the pivot 70, which in turn moves the rack 72 first in one direcion and then the other. The rack 72 acts through the pinion 74 to swing the winding head through a horizontal arc first in one direction and then the other. The composite and coordinated, vertical and horizontal oscillation of the winding head causes it to describe a rectangular loop which thus winds wire within the stator notch 90.

This continues until the counter registers the preselected number of revolutions for the shaft 28 which produces the desired number of turns on the stator 88. The counter 84 then operates a switch 110 and the motor 42 is de-energized. Simultaneously, brake 34 is actuated and the shaft 28 is brought to a standstill. The brake 34 is capable of stopping the shaft within a range of three hundred and sixty degrees (360°), or one revolution of the shaft 28, but what is desired is some means for stopping the shaft and returning it to the same position from which it started. The angular position of the shaft 28 determines the vertical displacement of the winding head 48, and it is this displacement which determines the length of "lead" wire 99 trailing from the stator 88.

To obtain a standard length of this "lead" wire, the winding head is returned to the same position shown in Fig. 1, following each winding operation. Thus the starting and stopping positions of the winding head are the same for each stator winding operation and therefore the length of the "lead" wire can be standardized.

Actuation of the air cylinder 78 is controlled by the counter 84. The counter 84 actuates the air cylinder at the end of the winding process. The air cylinder 78 forces plunger 80 downwardly (Fig. 7) bringing the roller 82 against the perimeter of the heart-shaped cam 76. The cam 76 is thus caused to rotate until it is positioned as shown in Fig. 7. Since the cam 76 is keyed to the shaft 28, the angular position of the shaft is defined and thus the vertical location of the winding head is determined.

The winding nest 12 is then elevated a given distance by an operator-controlled foot pedal or the like, drawing wire through the vertical shaft 44 by stripping it off the storage reel. Pressure is transmitted to the air cylinder 120 and the piston 118 is forced upwardly causing the rack 112 to bear against one side of the winding nest 12. When the rack 112 moves upwardly, the shaft 124 is rotated and thus rack 114 is driven upwardly to force the right-hand side of the nest 12 upwardly. The nest and wound rotor are moved to the position indicated in dotted lines (Fig. 8). The winding nest 12 is next lowered to its full-line position and this leaves enough slack wire between the last coil on the stator 88 and the winding head 48 to permit removal of the wound stator 88. The wound stator is next placed across the rods 96 on the support 94.

When the stator is located in this way, the trailing strand of wire is guided by the guide 104 into the aligned slots 100 and 102. The strand of wire is located in this way by laying it across the cutting device.

The strand of wire is not cut at this stage, however; the wound stator serves to anchor the wire that is wound onto a succeeding stator which is laid and clamped in the winding nest 12.

After a sufficient number of turns have been wound onto the succeeding stator so that the wire is self-anchored thereon, the power cylinder 108 on the cutting device is actuated by the counter 84.

The bar 97 moves relatively to the member 98, sliding therein toward the right (Figs. 5, 6). The left-hand edge of slot 100 closes on the right-hand edge of slot 102 and the wire 99 (Fig. 4) passing through the slots is thus cut by the closing of these edges.

Alternatively, the cutting operation on the trailing strand can be postponed until the succeeding stator is fully wound, but this has the disadvantage of bringing too many cycles of the machine to an end at the same time and thus schedules too much work for the operator at the same instant, rather than making it in spaced intervals.

An important feature of the invention is that the "lead" length of wire, i.e., the wire extending from the last turn on the winding is made of standard length. This is accomplished because the winding head starts and stops in the same position for each stator which is wound. The same length of wire is stripped off and trails after the stator when the winding nest is elevated. The wire is cut the same distance from the wound stator when it is positioned on the posts 96.

Although the invention has been described with reference to only a single selected embodiment, it will be apparent to those skilled in the art that the principles herein may be embodied in numerous other applications. It is my intention to include within the scope of the following claim all equivalent devices for obtaining substantially the objects and results of the invention.

What is claimed is:

In a coil winding apparatus for stators and the like of the type in which an elevatable winding nest is adapted to receive a stator, a driving means moves a winding head to form successive wire turns at high speed on the stator during a winding cycle and an auxiliary driving means moves the winding head to a predetermined position at the termination of a winding cycle: a holder disposed adjacent the winding nest for receiving the wound stator removed from the winding nest with wire trailing from the last applied winding on the stator to the winding head, means for cutting the wire which trails from the wound stator, said cutting means being located between the winding nest and said holder and including a movable cutting element, the situs of said holder with relation to said predetermined winding head position orienting the wire trailing from said wound stator into a position adjacent said cutting element, and means for automatically moving said cutting element to sever said trailing wire after a predetermined number of turns are wound on a succeeding stator.

References Cited in the file of this patent

UNITED STATES PATENTS

| | | |
|---|---|---|
| 2,594,707 | Allen | Apr. 29, 1952 |
| 2,631,788 | Cerasani | Mar. 17, 1953 |
| 2,632,602 | Weis | Mar. 24, 1953 |
| 2,633,220 | Chase | Mar. 31, 1953 |
| 2,640,652 | Harvey | June 2, 1953 |
| 2,770,424 | Grove | Nov. 13, 1956 |

OTHER REFERENCES

"Electrical Manufacturing," Automatic Armature Winding in Less Than One Minute, June 1947, pp. 111–114 and 196.